US011932491B2

(12) United States Patent
Haid

(10) Patent No.: US 11,932,491 B2
(45) Date of Patent: Mar. 19, 2024

(54) TRANSFER STATION CONFIGURED TO HANDLE CARGO AND CARGO RECEPTACLE SORTING METHOD

(71) Applicant: PICK8SHIP TECHNOLOGY AG, Dübendorf (CH)

(72) Inventor: Josef A. Haid, Gockhausen (CH)

(73) Assignee: Pick8Ship Technology AG, Wallisellen (CH)

( * ) Notice: Subject to any disclaimer, the term of this patent is extended or adjusted under 35 U.S.C. 154(b) by 214 days.

(21) Appl. No.: 17/056,834

(22) PCT Filed: May 22, 2019

(86) PCT No.: PCT/EP2019/063271
§ 371 (c)(1),
(2) Date: Nov. 19, 2020

(87) PCT Pub. No.: WO2019/224282
PCT Pub. Date: Nov. 28, 2019

(65) Prior Publication Data
US 2021/0179352 A1 Jun. 17, 2021

(30) Foreign Application Priority Data
May 22, 2018 (CH) ..................................... 00634/18

(51) Int. Cl.
*B65G 65/00* (2006.01)
*B65G 1/04* (2006.01)
(Continued)

(52) U.S. Cl.
CPC ......... *B65G 1/1375* (2013.01); *B65G 1/0492* (2013.01); *B65G 65/00* (2013.01);
(Continued)

(58) Field of Classification Search
None
See application file for complete search history.

(56) References Cited

U.S. PATENT DOCUMENTS

| 4,492,504 A | 1/1985 | Hainsworth |
| 4,678,390 A * | 7/1987 | Bonneton ............ B65G 1/1375 414/416.03 |

(Continued)

FOREIGN PATENT DOCUMENTS

| CN | 202609258 U | 12/2012 |
| CN | 205114249 U | 3/2016 |

(Continued)

OTHER PUBLICATIONS

International Search Report and Written Opinion for PCT/EP2019/063271 dated Aug. 13, 2019.
(Continued)

*Primary Examiner* — Mark C Hageman
(74) *Attorney, Agent, or Firm* — GrowIP Law Group LLC

(57) ABSTRACT

A transfer station configured to handle cargo receptacles, wherein the transfer station includes: a transfer device that includes at least one holder component configured to hold and release cargo receptacles, at least one platform configured to support the cargo receptacles, at least one transfer device frame extending in a vertical direction, in which the at least one platform is mounted in a vertically displaceable manner, the transfer device frame includes at least one lifting drive component configured to vertically displace the platform, a base member on which the transfer device frame is mounted, an electronic circuit configured to control the operation of at least one component of the transfer station.

27 Claims, 7 Drawing Sheets

(51) Int. Cl.
*B65G 1/137* (2006.01)
*G06Q 10/08* (2023.01)

(52) U.S. Cl.
CPC ..... *G06Q 10/08* (2013.01); *B65G 2201/0258* (2013.01); *B65G 2209/06* (2013.01)

(56) References Cited

U.S. PATENT DOCUMENTS

| | | | |
|---|---|---|---|
| 10,106,321 B2* | 10/2018 | Otto | B66F 9/07 |
| 10,242,399 B2* | 3/2019 | Kanellos | B62B 3/006 |
| 10,343,881 B2* | 7/2019 | Guo | B65G 1/10 |
| 10,683,171 B2* | 6/2020 | Jarvis | B65G 1/1375 |
| 10,793,353 B2* | 10/2020 | Nakano | B66F 9/06 |
| 11,338,997 B2* | 5/2022 | Ueda | B25J 9/0018 |
| 11,370,107 B2* | 6/2022 | Wu | B65G 1/0435 |
| 2009/0071923 A1 | 3/2009 | Wang | |
| 2014/0056672 A1 | 2/2014 | Mathys et al. | |
| 2018/0022548 A1 | 1/2018 | Mattern et al. | |
| 2018/0305124 A1* | 10/2018 | Guo | B65G 1/10 |
| 2019/0352092 A1* | 11/2019 | Zheng | B65G 1/1373 |
| 2020/0122924 A1* | 4/2020 | Otto | B66F 9/12 |
| 2021/0002074 A1* | 1/2021 | Otto | B66F 9/07581 |

FOREIGN PATENT DOCUMENTS

| | | |
|---|---|---|
| CN | 205972605 U | 2/2017 |
| CN | 206156173 U | 5/2017 |
| DE | 3247960 A1 | 8/1984 |
| EP | 0235488 A1 | 9/1987 |
| EP | 0302205 A2 | 2/1989 |
| JP | 01176706 A | 7/1989 |
| JP | 2017141102 A | 8/2017 |
| WO | 2017138377 A1 | 8/2017 |
| WO | 2019117844 A1 | 6/2019 |

OTHER PUBLICATIONS

Search report and Office Action for Chinese Application No. 2019800489343, dated Dec. 9, 2021.
First Office Action for EP 19 728 334.4 dated Sep. 29, 2023 (pp. 1-7).

* cited by examiner

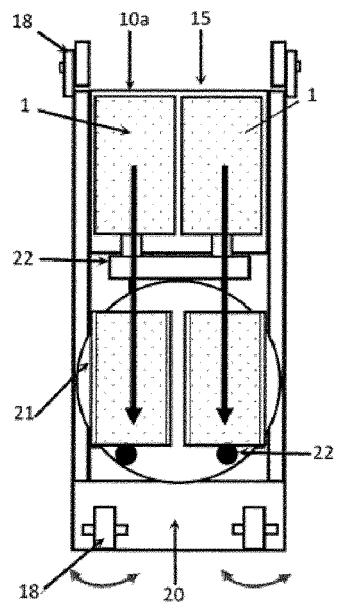
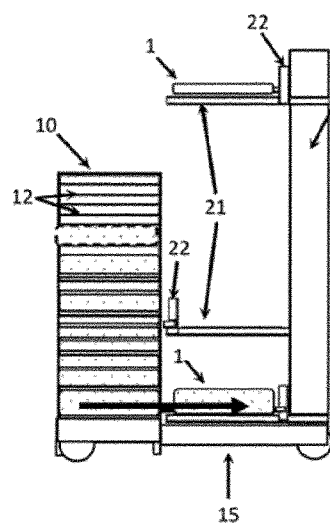
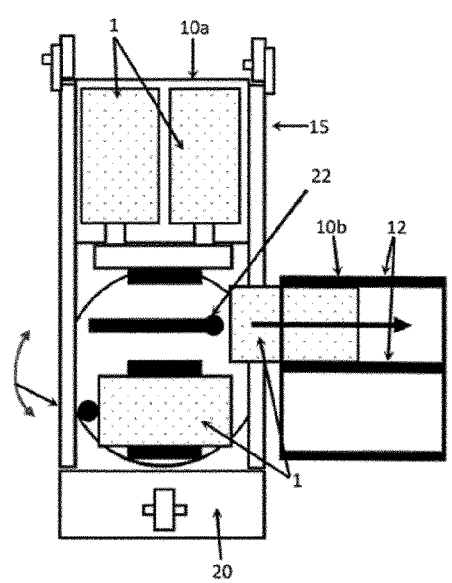
FIG. 3     FIG. 4     FIG. 5
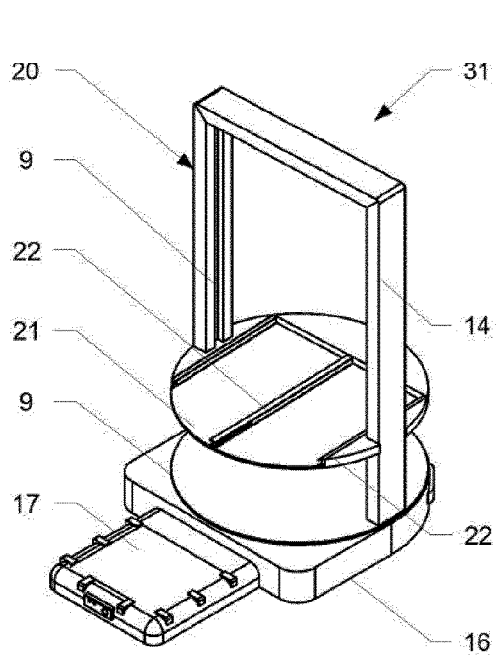
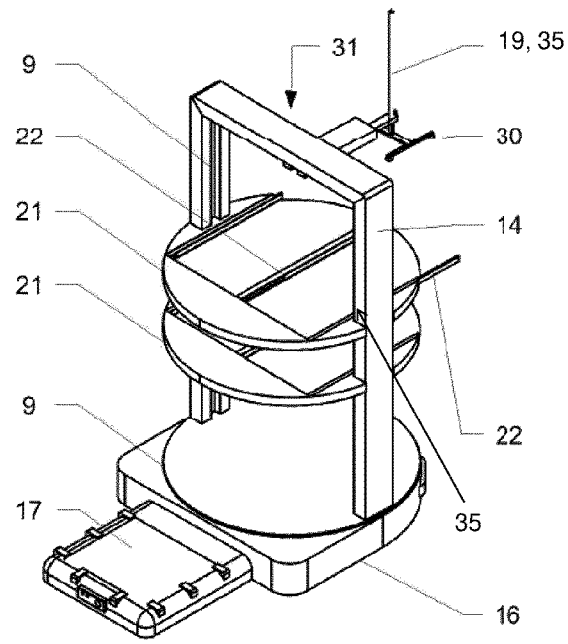
FIG. 6     FIG. 7

TRANSFER STATION CONFIGURED TO HANDLE CARGO AND CARGO RECEPTACLE SORTING METHOD

CROSS-REFERENCE TO RELATED APPLICATION

This application claims the benefit of the filing date of international PCT Application No. PCT/EP2019/063271, filed on May 22, 2019, that in turn claims priority to Swiss Patent Application No. CH00634/18, filed on May 22, 2018, the contents of which are hereby incorporated by reference in their entirety.

TECHNICAL FIELD

The present disclosure relates to a transfer station configured to handle cargo and a cargo receptacle sorting method.

BACKGROUND

Commerce has experienced considerable growth and improvement with respect to processes, technology, reliability and speed. Expectations continue to grow that cargo delivery times can be reduced. As the speed of cargo transportation such as trucks, ships and aircraft is not forecast to improve greatly for the foreseeable future due to increasing congestion, technological limitations and regulations, there is some hope that an improvement in cargo delivery times might be found by optimizing other segments of the logistics chain, such as packaging, sorting, storage and/or drone-based delivery. In particular, it was found that the sorting of various cargo items to different storage facilities and destinations requires heavy investment in large sorting centers that are capital intensive.

An object underlying the present disclosure is to provide an efficient way for cargo to be handled.

SUMMARY

In an aspect of the disclosure, a transfer station configured to handle cargo receptacles and/or cargo items is provided, wherein the transfer station comprises a transfer device comprising at least one holder component, the at least one holder component being configured to hold and release cargo receptacles and/or cargo items, wherein, by means of the at least one holder component, the transfer device is configured to move at least one cargo receptacle and/or at least one cargo item onto a support and remove the at least one cargo receptacle and/or at least one cargo item from a support, the respective support for example comprising a platform, a packing surface of a packing station, and/or a mounting surface, in particular a system of tracks of a cargo storage unit as described below in further detail. In addition, or alternatively, the transfer device is configured to move cargo items into a cargo receptacle as described in this document, preferably further configured to remove cargo items from a cargo receptacle.

In an aspect of the disclosure, a transfer station configured to handle cargo receptacles is provided, wherein the transfer station comprises a transfer device comprising at least one holder component configured to hold and release cargo receptacles and further comprises at least one platform configured to support the cargo receptacles. The transfer device may further comprise at least one transfer device frame extending in a vertical direction, in which the at least one platform is mounted in a vertically displaceable manner. Preferably, the transfer device frame comprises at least one lifting drive component configured to vertically displace the platform. In a variation, the transfer station comprises a base member on which the transfer device frame is mounted.

In the following, where the transfer station is mobile and configured to travel between different positions of travel, the transfer station may be considered a vehicle. The features of and in relation to the vehicle described generally and in reference to the figures may also constitute features of and in relation to the transfer station.

In the following, the features of and in relation to a cargo receptacle cart described generally and in reference to the figures may also constitute features of and in relation to a cargo storage unit generally. Means of locomotion of the cargo storage unit, such as wheels, are optional. A cargo storage unit may comprise a rack comprising an arrangement of shelves or tracks on which cargo and/or cargo receptacles may be placed.

In the following, the features of and in relation to a tracking system described generally and in reference to the figures, in particular an electronic tracking system, may also constitute features of and in relation to an electronic logistics management system and/or to an electronic warehouse management system. The term tracking is not limited to an ordered temporal sequence of transmission and reception of position data but may be used in a general sense to include means for identification of information relating to a cargo receptacle, cargo storage unit and/or transfer station, such as position, destination and/or category or type of transported cargo.

In a variation, the transfer station comprises an electronic circuit configured to control the operation of at least one component of the transfer station. In the following, an electronic circuit may comprise one or more of the following: a processor, memory, bus, i/o interface, user interface, sensor, network, network element.

In a variation, the at least one transfer device frame of the transfer station is rotatably mounted in the transfer station, preferably in the base member, if the latter is provided. The base member may comprise at least one turning drive component configured to rotate the transfer device frame about a vertical axis.

In a variation, the transfer station, in particular the base member, comprises a travel drive component configured to move the transfer station between positions of travel. In a variation, the travel drive component is configured to rotate the transfer station along its vertical axis. The travel drive component may comprise wheels configured to roll on the ground or, alternatively, comprises wheels configured to roll on a track or on tracks.

In a variation, the transfer station, in particular the base member, is mounted on a fixed support, such as a fixed cargo storage unit. Alternatively, the base member is mounted on a mobile support, such as a shuttle, the shuttle being configured to travel between positions along an aisle in a warehouse and/or high bay depot, in particular between cargo storage units, for example. The shuttle may be mounted on rails or tracks provided along the aisle. In a variation, the transfer station is mounted on a transport vehicle, such as a delivery van or truck. The transfer station may also be mounted to a fixed position on a floor or shelf of a storage or sorting facility, such as a warehouse.

In a variation, the transfer station comprises at least one holder component configured to hold and release cargo storage units, in particular cargo receptacle carts. For example, the at least one holder component configured to hold and release cargo storage units comprises a platform configured to support a cargo storage unit from its underside.

In a variation, the at least one lifting drive component comprises one of a screw-and-nut lift or a linear actuator displaceably mounted on a track.

In a variation, the at least one platform may be mounted in the transfer device frame and is rotationally fixed.

In a variation, the at least one platform is mounted to the transfer device frame in a configuration wherein the platform may be rotated independently of the transfer device frame. In a variation, the transfer device comprises at least one independent platform turning drive component configured to rotate the at least one platform independently from the transfer device frame, such as an electric turntable drive. The at least one independent platform turning drive component may be arranged separately from the at least one lifting drive component or it may be arranged jointly thereto. For example, the independent platform turning drive component may comprise rollers fixed to the at least one lifting drive component and which are configured to engage the at least one platform and allow its rotation, in particular while it is being raised or lowered. The rollers may be powered for active rotation of the at least one platform or they may be passive to allow for its rotation, for example if it is driven by a direct turntable drive or a belt drive.

The at least one electronic circuit of the transfer station may comprise a communications interface, preferably a wireless communications interface, configured to send and receive transfer station operation information to and from the electronic tracking system set up in the environment of the transfer station. The transfer station operation information may include drive status information and holder status information. The communications interface may also be configured to send and receive status information such as position, occupancy and/or vacancy of cargo receptacle slots in cargo storage units, to the electronic tracking system and receiving instructions from the electronic tracking system, such as route information, cargo receptacle loading and/or unloading instructions.

In a variation, the at least one holder component configured to hold and release cargo receptacles is mounted on the at least one platform. It may comprise at least one push-pull mechanism configured to remove a cargo receptacle from a cargo storage unit and to insert the cargo receptacle into a cargo storage unit. The at least one push-pull mechanism may be configured to pull at least one cargo receptacle from a cargo storage unit onto the at least one platform and push it off the platform into an appropriate slot of a cargo storage unit. It may comprise at least one bar, preferably a pair of bars, configured to harness, pull, push and release a cargo receptacle to and from a cargo storage unit. The at least one push-pull mechanism is preferably operated electronically. For example, it may comprise a servomotor for axial displacement of the at least one bar or pair of bars.

In a variation, the at least one platform of the transfer station is configured to support a plurality of cargo receptacles at the same time next to each other. The at least one platform may then comprise a plurality of holder components, in particular a plurality of push-pull mechanisms, more particularly a plurality of bar pairs.

In a variation, the at least one holder component comprises a picking device configured to pick cargo items for placement into, or removal from, cargo receptacles. In a variation, the picking device is configured to open and close cargo receptacles, in particular to open and close an external access of a respective cargo receptacle, such as a lid, door or panel. The external access of the respective cargo receptacle may be arranged at the top or side of the cargo receptacle and may comprise a lock.

In a variation, the transfer device comprises a plurality of platforms configured to support the cargo receptacles, wherein the platforms are mounted on the at least one transfer device frame in a vertically displaceable manner, wherein the platforms are spaced apart from each other in the vertical direction. Preferably, the platforms are arranged one over the other. They may be raised or lowered by one or different lifting drive components. Further they may be rotated by one or different independent platform turning drive components.

Preferably, the cargo receptacles referred to in this document generally comprise a mount, wherein the at least one holder component of the transfer station is configured to hold and release the cargo receptacles by their respective mount. The mount is preferably self-supporting and may comprise a rim, in particular a flange or rim structure, suitable for mounting the cargo receptacle on a support surface. The support surface may be part of a cargo storage unit and/or cargo hold. The mount may comprise a tray. In particular, the mount may comprise a handling fixture configured to be taken hold of and released by the at least one holder component, in particular the push-pull mechanism of the transfer station. The handling fixture may include a handle or a docking element. The docking element may include at least one recess and/or at least one projection to engage a complementary part of the holder component. The docking element may also include a magnet.

In an aspect of the disclosure, a cargo receptacle is proposed, comprising a mount, an optional flexible member and an external access to the cargo as described in this document, further comprising a cargo volume adjustment mechanism configured to increase and decrease the interior volume of the cargo receptacle. Generally, the cargo volume adjustment mechanism may comprise a first end interconnected to the mount, for example to a side wall of the mount's tray, where one is provided. In a variation, the cargo volume adjustment mechanism is removably interconnected to the mount.

Preferably, the cargo volume adjustment mechanism is extendible and collapsible in height. For example, it may comprise at least one scissor-lift.

In a variation, the cargo receptacle comprises a secondary frame and the cargo volume adjustment mechanism comprises a second end interconnected to the secondary frame. Good results are achieved when the secondary frame and the mount are interconnected in a mutually displaceable manner, preferably in a vertically displaceable manner.

In an aspect of the invention, a cargo storage unit, in particular a cargo receptacle cart, is proposed, comprising a polyhedron frame comprising at least one access face for insertion and removal of at least one cargo receptacle as described in this document. The cargo receptacle cart further comprises a system of tracks spaced apart laterally for carrying the at least one cargo receptacle by its mount, in particular by its rim, each track comprising a mounting surface or seat extending laterally between the access face and an opposite face of the frame. For example, the polyhedron frame comprises pillars at each corner and the tracks may extend between two corner pillars along a face of the frame adjacent an access face. Preferably, the cargo receptacle cart comprises an array of track pairs arranged on different height levels of the cart, the track pairs preferably being arranged equidistant from one another in height direction. Instead of pillars, the cargo receptacle cart may comprise sides made of sheets constituting the faces of a polyhedron, in particular metallic sheets, interconnected at vertices. Preferably, the cargo receptacle, the cargo storage unit and/or the transfer station, comprise ID-tags or optical status indicators. In a variation, an optical status indicator is arranged on the cargo receptacle to indicate its fill status as vacant, partially vacant or full, and/or whether or not the cargo contained therein is a return-delivery. In a variation, the optical status indicator indicates whether or not the cargo receptacle shall be removed from the cargo storage unit. The optical indicator may comprise a light, in particular an LED or array of lights or LEDs, emitting a color that depends on the status of the cargo receptacle.

In a variation, the cargo receptacle and/or the cargo storage unit comprise a wireless communications interface for communicating with an electronic tracking system, in particular for setting any optical status indicators, if provided.

In an aspect of the disclosure, a cargo receptacle sorting method is provided, in which a transfer station or transfer device as described in this document is used, whereby the at least one holder component transfers cargo receptacles from at least one cargo storage unit onto the at least one platform and the at least one holder component transfers the cargo receptacles from the at least one platform to at least one cargo storage unit. The cargo receptacles may be transferred between different cargo storage units or between different slots or levels of one and the same cargo storage unit.

In a variation of the method, the transfer station moves the at least one cargo storage unit to a position where the at least one holder component is in handling reach of at least another cargo storage unit.

The transfer station may select a cargo receptacle for transfer to a receiving cargo storage unit and select the receiving cargo storage unit based on information assigned to the cargo receptacle and on information assigned to the receiving cargo storage unit.

The assigned information may be encoded on an electronically or optically readable indicator, such as a light or an ID-tag which may be arranged on the cargo receptacle and/or on the cargo storage unit.

In a variation of the method, the transfer station comprises a picking device which picks cargo from a cargo hold or from a cargo storage unit and places it into the at least one cargo receptacle on the least one platform. In particular, a plurality of cargo receptacles may be placed next to each other on the at least one platform. In a variation, the picking device opens and closes cargo receptacles, for example by means of mechanically releasing a lock of an external access of the cargo receptacle.

In an aspect of the disclosure, a cargo logistics system is proposed, comprising at least one cargo receptacle as described in this document, at least one cargo storage unit as described in this document, and at least one transfer station or transfer device as described in this document, each of these being coordinated with respect to the other for carrying out a cargo logistics method as described in this document, preferably by means of an electronic tracking system.

Because the sorting of cargo is done directly from a cargo storage unit to another by means of transfer stations, no separate conveyor or sorter-grid based sorting equipment is required. Cargo can remain in cargo storage units, in particular in cargo receptacle carts, from packing of cargo into a cargo receptacle to delivery of the cargo to an ordering recipient, and can thus be handled with maximum care and minimal disturbance.

In a variation, the cargo logistics system comprises an electronic tracking system including an electronic circuit, the electronic tracking system being configured to track the cargo receptacle, the cargo storage unit and/or the transfer station, for example based on detecting identification tags and/or optical indicators if provided.

The electronic circuit of the electronic tracking system may comprise at least one of the following elements: data memory, a processor, a communications interface for communication with cargo receptacles, cargo storage units and/or transfer stations, preferably a wireless communications interface, a user interface for use by an operator, a network element, a communications network linking one or more of these elements. The electronic circuit of the tracking system may also comprise sensors or detectors for detecting position, size and/or status information of the cargo receptacle, the cargo storage unit and/or the transfer station. A respective sensor or detector may be arranged on a transfer station and/or on a cargo storage unit or at certain fixed positions in a warehouse. In a variation, the electronic tracking system includes any optical indicators and/or tags, in particular electronic tags such as active or passive electronic tags including RFID tags, and/or codes, in particular bar-codes, where provided on a cargo receptacle, cargo storage unit and/or a transfer station, the indicators and/or tags being configured to communicate with the electronic circuit of the tracking system. The electronic tracking system may also include handheld devices for reading the optical indicators and/or tags, such as a handheld bar-code reader.

The electronic tracking system of the cargo logistics system may be configured to maintain an inventory and localize cargo receptacles, cargo storage units and/or transfer stations based on RFID, BLE (Bluetooth Low Energy), NFC, mobile tracking technology or other localization technique. Identification of cargo receptacles and/or cargo content thereof, cargo storage units and/or transfer stations may be done based on information transmitted via the mentioned optical indicators and/or tags. The identification may also be done through a specific identification number logic detectable on the respective cargo receptacle, cargo storage unit or transfer station, for example via an identification tag or visual indicator or code. The identification number logic may include information such as the cargo item, size, and capacity of the cargo receptacle cart and it may be printed or hand-written.

In a variation, the electronic tracking system is configured to track the shipment status of each cargo receptacle, based on, for example, optical indicators such as differently colored lights. For example, ready for delivery cargo receptacles indicate this status with a green light, cargo receptacles intended for return are indicated with a red light, and cargo receptacles containing second deliveries are indicated with an orange light and cargo receptacles containing new cargo are indicated with a yellow light. The lights may be arranged on the respective cargo receptacle and include LEDs. In addition, or alternatively, the electronic tracking system is configured to track the shipment status of the cargo receptacle via computer screens or handheld devices.

In a variation, a computer program is mounted or installed on the electronic circuit for running the electronic tracking system, in particular controlling the cargo storage unit, for example the locking bar or door of a cargo receptacle cart as described below, and/or controlling the transfer station, in particular any component of the transfer station, and/or controlling an optical indicator or active electronic tag of a cargo receptacle, cargo storage unit and/or transfer station where provided.

The electronic tracking system is preferably installed in a warehouse, fulfillment center, sorting area, transfer area of a mail-order firm, logistics center and/or depot.

In a variation, the cargo logistics system comprises a packing station including an arrangement of at least one packing surface such as a table or system of track pairs for mounting a cargo receptacle, a plurality of cargo receptacles, at least one transfer station, and a plurality of cargo storage units. In a variation, the packing station comprises a lifting device for lifting and lowering the packing surfaces. Preferably, the packing station includes a picking machine, in particular a picking robot, although service personnel may be employed instead. At least one of the cargo storage units preferably carries an empty cargo receptacle. In a variation, the packing station includes at least one transfer station as described in this document, whereby the transfer station may be configured to retrieve a packed cargo receptacle from the packing surface. The picking robot, where provided, may be configured to pick cargo from a cargo storage nearby and place it in the cargo receptacle which, in a variation, the transfer station has extracted from a standby cargo storage unit and placed on the packing surface. As in the case of the transfer station, the packing station preferably comprises an electronic circuit including a communications interface for communicating with the tracking system of the cargo logistics system, in particular receiving operation instructions therefrom. The electronic circuit of the packing station preferably also includes sensors or detectors for detecting position, size and/or fill-status of cargo receptacles. As in the case of the transfer station, a computer program is preferably mounted or installed on the electronic circuit for operating or operating a part of the packing station such as the packing surfaces and the transfer station. At the packing station, two or more cargo storage units are preferably arranged within reach of the transfer station. One of the cargo storage units receives packed cargo receptacles, packed, for example, by the picking robot, while the at least one other cargo storage unit is on standby to provide the transfer station and packing robot with empty cargo receptacles where needed. The cargo logistics method as described in this document may include bringing a cargo storage unit to a packing station, for example by a transfer station, and providing an appropriately sized cargo receptacle at the packing station, in particular transferring, by the transfer station, an appropriately sized cargo receptacle to a packing station, in particular a packing surface of the packing station.

The cargo logistics system, in particular its electronic tracking system, may further be configured to allocate the appropriate cargo receptacle size to a shipment, in particular the appropriate height, depth and/or width. For packing, for example, the electronic tracking system may be configured to determine which cargo receptacle is best suited for the cargo to be packed and which cargo receptacles are already full, for example in the case of second deliveries or already packed new deliveries, and which cargo receptacles in a cargo storage unit are free for packing. In a variation, the cargo logistics system, in particular the electronic tracking system, is configured to determine an appropriately sized cargo receptacle for packing based on order data from an order fulfilment and/or ERP system.

The cargo logistics system, in particular its electronic tracking system, may further be configured to determine the appropriate height for the packing surface at the packing station. To help achieve adequate ergonomics for service personnel or the appropriate height for a picking robot, the cargo logistics system determines the optimal height of the adjustable packing surface. The height is defined based on the height of service personnel or a picking robot along with the expected cargo or cargo receptacle height, for example based on order management information stored in the tracking system, in particular its electronic circuit.

Further, the cargo logistics system, in particular its tracking system, may determine the appropriate storage position for a cargo receptacle in a cargo storage unit. The cargo logistics system may be configured to determine in which storage position or on which level of the cargo storage unit the new cargo receptacle can be placed to optimize use of space in the cargo storage unit, for example following a packing process. This determination may be done by the cargo logistics system based on measures of the cargo receptacle, whereby the tracking system may be configured to measure, by a measuring device interconnected to the packing surface, the size of the cargo receptacle. The measuring device may be an optical and/or laser measuring device, for example. The determination may also be derived from account inventory information on occupied/vacant storage positions in the cargo storage unit.

Further, the cargo logistics system, in particular its tracking system, may be configured to assign destinations to cargo storage units based on shipment data, for example expected volume or number of cargo receptacles per destination, and/or historical shipment data analyzed by Artificial Intelligence (AI). For example, the electronic tracking system may be configured to determine which cargo storage units are destined for what destination, such as a unique delivery address, a distribution or sorting center, or a depot.

Further, the tracking system of the cargo logistics system may be configured to manage the transfer of cargo receptacles to cargo storage units by means of the at least one transfer station. Based on the cargo receptacles stored in first cargo storage units, the tracking system may be configured to determine the transfer of each cargo receptacle to a second cargo storage unit and storage level therein. Based on this determination, the at least one transfer station receives instructions on routes and stops throughout the sorting or transfer area. For each stop, for example, the electronic tracking system may be configured to determine which cargo receptacle shall be moved by the at least one transfer station from a first cargo storage unit and where it shall be placed in a second cargo storage unit. Based on this determination, the at least one transfer station receives instructions on the routes to follow. For speed and simplification, the route of the at least one transfer station may alternatively be determined by other electronic devices and algorithms, for example by machine-vision-based navigation and swarm logic making use of sensors of the transfer station's electronic circuit, where provided.

The described cargo logistics system has the advantage in that it allows for dynamic transfer and sorting of cargo. On the fly, the cargo logistics system may assign cargo storage units to destinations and cargo receptacles to cargo storage units and may at any time change assignments and rearrange cargo receptacles.

Given the re-usability of the cargo receptacles and provided the availability of dynamic information on cargo, cargo storage units, sizes, loads and localization thereof, the cargo logistics system is also configured to consolidate and coordinate cargo logistics by selecting, moving and in particular bringing together cargo receptacles at predefined locations.

In a variation, the cargo logistics system comprises a transport management system configured to select shipment methods based on a dynamic database of available delivery routes, delivery route capacity, current and historical shipment data, each of which may be determined by AI or from external data sources. The transport management system may be a part of the electronic tracking system or it may be separate and interconnected to the electronic tracking system. Using the dynamic data, the transport management system is configured to determine an optimal shipping method for cargo, such as last mile delivery or indirect routing via additional sorting centers or city depots. Participating in the determined optimal shipping method, the at least one transfer station is for example configured to receive instructions from the electronic tracking system to move occupied cargo storage units ready for shipment to a loading area and load them onto appropriate transport vehicles, such as transport vehicles used in long haul FTL, short haul LTL, courier, express, and/or private transport, said transport vehicles including autonomous vehicles such as drones, trucks, bikes, e-bikes, cars, aircraft and ships.

In a variation, the cargo logistics system, in particular its electronic tracking system is configured to determine the timing and sequence of cargo deliveries, wherein exact shipment information and storage location of cargo receptacles and cargo storage units on the transport vehicles are available to the electronic tracking system, in particular the transport management system. Based thereon, the electronic tracking system is configured to determine what cargo shall be delivered, how, and when. Compared to today's last mile delivery systems, where drivers manually sort cargo into delivery trucks, considerable time and labor savings are achieved. Localizing cargo receptacles and cargo storage units, the cargo logistics system can automatically update shipment status of each shipment.

The cargo logistics system also has the advantage that it can be configured to perform last minute changes or transport optimizations. For example, in case of deviations between expected and real volumes per destination or last minute changes of customers, the cargo logistics system, in particular its electronic tracking system, may be configured to instruct the transfer station or stations to sort, pick, rearrange, and/or single out cargo receptacles from cargo storage units having a destination for direct or express shipment routed separately.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The present disclosure will be more fully understood from the detailed description given herein below and the accompanying drawings which should not be considered limiting to the disclosure described in the appended claims, wherein:

FIG. 3 shows an operational state of another vehicle suitable for moving a cargo receptacle cart and handling cargo receptacles;

FIG. 4 shows an operational state of another vehicle suitable for moving a cargo receptacle cart and handling cargo receptacles;

FIG. 5 shows an operational state of another vehicle suitable for moving a cargo receptacle cart and handling cargo receptacles;

FIG. 6 shows a first transfer station;

FIG. 7 shows a second transfer station;

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, like reference numbers will be used to refer to like components or parts.

Figure 1:
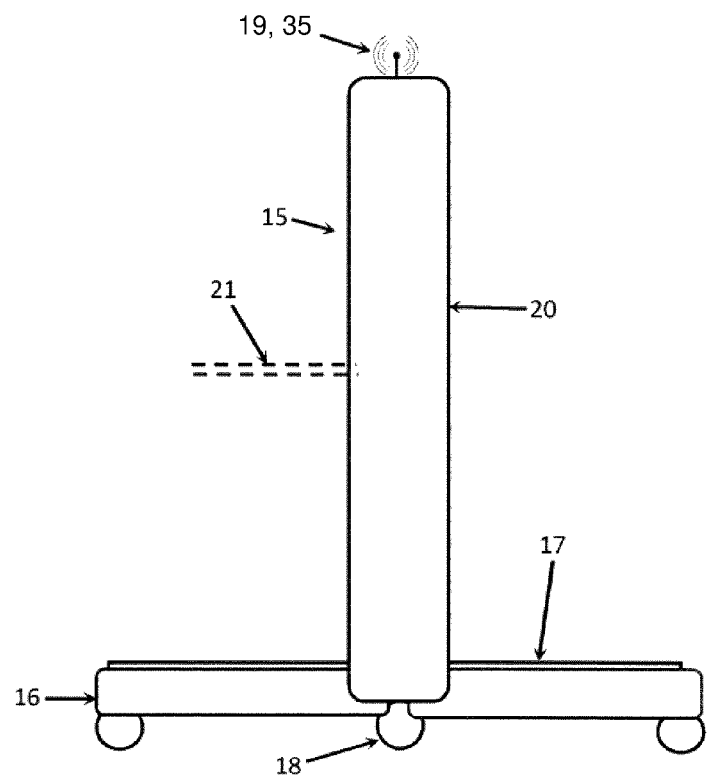
FIG. 1 shows a vehicle suitable for moving a cargo receptacle cart and handling cargo receptacles.

FIG. 1 shows a vehicle 15 for moving a cargo receptacle cart 10 as described in this document. The vehicle comprises a base member 16 containing the drive of the vehicle a holder in the form of a lifting member 17 for raising and lowering a cargo receptacle cart 10, a set of wheels 18, and a wireless control interface 19 of an electronic circuit. Although a lifting member 17, in particular a lifting platform or fork 17 is shown, any holder or holding device suitable for holding a cargo receptacle cart 10 may be used. The base member 16 contains an electronic circuit comprising an installed computer program for controlling the robot based on instructions received via the wireless interface 19 that is configured to receive control instructions from a tracking system of an electronic circuit of a cargo logistics system described in this document and to send drive status information and holder status information to the electronic circuit. In addition, the vehicle 15 may comprise a number of sensors 35 in order for it to navigate between locations for picking up and leaving cargo receptacle carts 10. The computer program may comprise artificial intelligence (AI) functions and modules, based on, at least in part, machine learning. Essentially, the vehicle 15 may be considered an autonomous or semi-autonomous robot with means to hold, transport, and release a cargo receptacle cart 10. Further, FIG. 1 shows the vehicle comprising a transfer device 20 comprising a lift and at least one lifting platform 21 suitable for removing a cargo receptacle 1 from a first cargo receptacle cart 10a (see FIG. 2) on to the lifting platform 21 and then moving the cargo receptacle 1 into a second receptacle cart 10b (see FIG. 2). The transfer device 20 is configured to lift and lower the at least one lifting platform 21 and to rotate the respective lifting platform 21, in which case the lifting platform 21 may be considered a turntable (see also FIGS. 3 to 8). The transfer device 20 may also comprise push-pull devices, for example pistons, forks or grasping/holding arms, for transferring cargo receptacles 1 from a first cargo receptacle cart 10*a* to a second cargo receptacle cart 10*b* via the respective lifting platform 21. Although the vehicle 15 shows the transfer device 20 to be arranged approximately midway on a base body 16, other arrangements are possible, such as those shown in the following figures.

Figure 2:
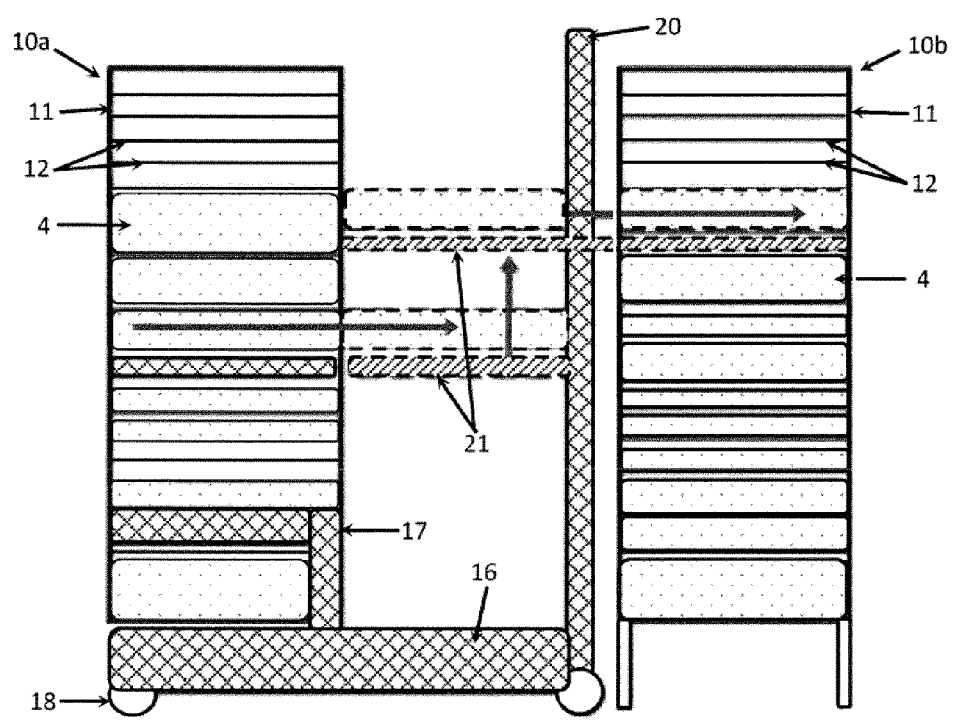
FIG. 2 shows a vehicle in an operating state suitable for moving a cargo receptacle cart and handling cargo receptacles.

FIG. 2 shows the operation of the vehicle 15, as described with reference to FIG. 1. The vehicle 15 drives to pick up first cargo receptacle cart 10*a* from a pickup position by means of a holder such as a lifting platform or fork 17. The lifting platform 17 shown in this drawing is at a distance from the base body 16 of the vehicle 15 to improve stability of the first cargo receptacle cart 10*a* while it is being picked up, transported and set down. The lifting platform or fork 17 is suitable to be inserted into a section of the first cargo receptacle cart 10*a* between pairs of tracks 12 on different levels of the cart 10*a*. After pickup, the vehicle 15 drives to and stops at a transfer position next to a second cargo receptacle cart 10*b*. At the transfer position, the transfer device 20 of the vehicle 15, by means of suitable push-pull devices (see FIGS. 3 to 8 for further detail on the push-pull devices), moves cargo receptacles 1 from the first cargo receptacle cart 10*a* and onto the lifting platform 21. The lifting platforms, in particular turntables 21, are raised and lowered to appropriate positions where the transfer device 20, by means of suitable push-pull devices, moves the cargo receptacles 1 into the appropriate available slots of the second cargo receptacle cart 10*b*. When this operation is completed, the vehicle 15 returns to a pickup position and the process is repeated according to a sorting plan. For example, the second cargo receptacle cart 10*b* is assigned a certain destination, such as an intermediate holding area, for example a local post office. Preferably, the vehicle 15 comprises sensors 35 to detect the destination and content of cargo receptacles 1 according to their ID tags, if provided. The detected information is sent to the electronic circuit of the vehicle 15 based on which the driver of the vehicle 15 and the transfer device 20 are operated. Alternatively, the detected information is sent to the electronic circuit of a cargo logistics system as described in this document via the wireless control interface 19, whereupon, via the same or other wireless control interface, the vehicle 15 receives operation commands from a command unit of the cargo logistics system.

FIG. 3 is top view onto the vehicle 15 as described with reference to FIG. 2. Two cargo receptacles 1 carried by a first cargo receptacle cart 10*a*, itself transported by the vehicle 15, are pulled or pushed onto a turntable 21 of the transfer device 20 by means of push-pull device 22. Push-pull device 22 preferably takes the form of a fork, which slides underneath the respective cargo receptacle 1, carries out a slight lifting operation and pulls the respective cargo receptacle 1 onto the turntable 21.

FIG. 4 is a side view onto the vehicle 15 shown in FIG. 2. Multiple, in particular three, turntables 21 and their respective push-pull devices 22 of the transfer device 20 are shown for transferring multiple cargo receptacles 1, in particular six receptacles 1, in parallel to a second cargo receptacle cart 10*b*.

FIG. 5 is a top view onto the vehicle 15 as shown in FIG. 2 in the states where the turntable has turned by 90° and the cargo receptacles 1 are pushed by means of push-pull devices 22 into the second cargo receptacle cart 10*b*, in particular onto the appropriate tracks 12 of said cart.

FIG. 6 shows a partially or fully autonomous transfer station 31, in particular a vehicle, comprising a base member 16 in which a travel drive component for directing the travel of the transfer station is arranged. In the case of a partially autonomous transfer station, the latter is partly controlled by an electronic logistics management system, in particular tracking system 34 external to the transfer station 31, as described with reference to FIGS. 12 and 16. In the case of a fully autonomous transfer station 31, its operation, in particular the operation of its components described below, is directed by an AI-program run on at least one electronic circuit, for example a machine vision program configured to process ID information present on cargo receptacles or cargo items as previously described, in combination with a cargo sorting plan that may be downloaded or streamed from a server.

The travel drive component of the transfer station 31 includes a set of wheels and a chassis and an electric motor for driving the wheels. The base member 16 further includes a lifting platform 17 configured to lift a cargo storage unit, in particular a cargo receptacle cart. The lifting platform may be extended from and retracted into the base member 16. Alternatively, however, the lifting platform 17 extends away from the base member 16, wherein its lateral position is fixed. The lifting platform 17 is configured to be maneuverable underneath a cargo storage unit, such as a cargo receptacle cart. The lifting platform 17 is further configured to be raised and lowered to an extent sufficient to raise the cargo storage unit up from the ground and carry it between different travel positions. The lifting platform 17 may comprise a number of fixtures facilitating the stable maneuvering and transport of lifted cargo storage units, in particular appropriately arranged projections and or latches. For extending and retracting the lifting platform 17 and or for lifting it, the latter is preferably driven by an electric lifting platform motor which may be arranged in the base member 16.

Still referring to FIG. 6, the transfer station 31 further includes a rotatable transfer device 20 comprising a transfer device frame 14 and a platform 21 mounted in the transfer device frame 14. The platform 21 is configured to support one or more cargo receptacles and one or more cargo items. The transfer device frame 14 extends vertically from the base member 16 and comprises two vertical legs extending upward from the base member 16 and a horizontal upper beam connecting the upper ends of the legs. The platform 21 is mounted between the legs. The transfer station 31 further includes an electric lifting drive component configured to engage and in particular to raise and lower the platform 21 along the transfer device frame 14, in particular along the inner sides of the legs of the transfer device frame 14. The platform 21 comprises an anchor consisting of two anchor elements, each anchor element being arranged at a position along the periphery of the platform 21 and engaging the lifting drive component in the respective leg of the transfer device frame 14. The lifting drive component may include a lift, such as a screw and nut lift arranged in each leg of the transfer device frame and an electric lifting drive component motor configured to power said lift. The respective screw and nut lift may comprise a threaded bar as a screw and a drive nut in engagement thereto. The electric lifting drive component motor may be arranged in the base member 16 of the transfer station 31. Instead of a lift, in particular a screw and nut lift, a linear motor may be provided on rail in a respective leg of the transfer device frame 14, the respective anchor of the platform 21 being mounted to the linear motor.

The transfer device 20 is rotatably mounted in the base member 16 and is driven by an associated turning drive component. The legs of the transfer device frame 14 may be mounted at their respective base end in the base member 16 so as to revolve and be driven around a common central point by the turning drive component, thereby rotating the transfer device 20. In the present example, the transfer device 20 comprises a base platform 9 from which the legs of the transfer frame 14 extend upward. The base platform 9 is circular and rotatably mounted in the base member 16. The turning drive component is configured to rotate the base platform 9. Alternatively, the base platform 9 may be ring-shaped. The turning drive component may be a direct drive or a belt drive.

In addition, or alternatively, the platform 21 may be rotatably mounted to the transfer device frame 14 and be configured to rotate separately from the transfer device frame 14. For example, the transfer device frame 14, in particular its respective leg, may comprise an electric roller drive configured to rotate the platform 21, for example by engaging the periphery of the platform 21 in a clamping manner by a pair of electrically driven rollers. The electric roller drive may be joined to the linear motor.

With further reference to FIG. 6, a holder component 22 is arranged on the platform 21 and is configured to hold and release cargo receptacles. The holder component 22 may generally also be configured to hold and release certain cargo items, such as clothing, in particular pre-packaged cargo items including pre-packaged clothing. In this example, the holder component 22 comprises laterally extendible and/or translatable bars. The bars may be in a lateral arrangement so as to constitute at least one laterally extendible fork, and or they may be individually laterally extendible. The holder component 22 may be driven by a holder component drive which may be arranged in the platform 21 itself or in the transfer device frame 14. The holder component 22, in particular the arrangement of extendible bars, is configured to be moved and/or extended underneath a cargo receptacle as described in this document or cargo item stored in a cargo storage unit, such as a cargo receptacle cart or a cargo rack, and to remove the receptacle or item therefrom. The holder component 22 further is configured to place and leave a cargo receptacle or cargo item in a cargo storage unit. To assist with the removal and placement of a cargo receptacle 1 or cargo item from/into a cargo storage unit, the holder component 22 may be configured to be inclined and/or lowered and raised slightly.

FIG. 7 shows a transfer station 31 comprising, in addition to features disclosed in reference to FIG. 6, a further platform 21 arranged below or above the platform 21 already described. The further platform 21 is mounted to the transfer frame 14 in the same manner and may comprise the same features, including those of the holder component 22. Both platforms 21 may operate in parallel for retrieval and/or placement of cargo receptacles or cargo items from/into cargo storage units. The platforms may be mounted on the same or on different lifting drive components 9. In case of the latter, two lifting drive components, each including a lift, such as a screw and nut lift, may be arranged in each leg of the transfer device frame and a respective electric lifting drive component motor configured to power said lift.

The transfer station 31 shown in FIG. 7 further comprises a picking device 30 operatively coordinated with the further platform 21, in particular with the holder component 22 arranged on the platform 21. The picking device 30 is configured to hold and release, in particular to pick and drop, cargo items, such as clothing items which may be prepackaged. In some variations of the transfer station 31, the picking device 30 can be considered to constitute an element of the holder component 22. The picking device 30 is operatively coordinated, for example by means of a picking device drive, with the further platform 21 in such a way that the picking device 30 picks a cargo item from a cargo storage unit and places it in one or more cargo receptacles 1, which may be empty or partially filled with cargo, resting on the further platform 21. The picking device 30 in the present example is mounted to the transfer device frame 14, but it may alternatively be mounted to either of the platforms 21. As the picking device 30 then rotates together with the transfer device, this facilitates coordination to accurately place a cargo item into the appropriate cargo receptacle. The picking device 30 may comprise a bar or frame equipped with air suction pads to pick the cargo item from the cargo storage unit. The bar or frame may be extended, raised and lowered to be maneuvered above the item to be picked, to a distance sufficiently close to the item for the suction pads to attract the item. The picking device drive then preferably includes an air suction control device for creating and relieving negative air pressure in the suction pads for picking and releasing cargo items. In addition, or alternatively, the picking device 30 may comprise at least one robotic grabber. For the combination of suction pads and the at least one robotic grabber, the latter may be provided with suction pads to facilitate handling, in particular delicate handling of the cargo item. The transfer station 31 is further shown in this example to comprise a wireless control interface 19 for communication with a tracking system 34 configured to assist the operation of the transfer station.

The transfer device 31 may comprise one or more electronic circuits configured to control the operation of at least one component of the transfer station, such as the travel drive component, lifting drive component 9, turning drive component, holder component 22 and/or picking device 30.

Figure 8:
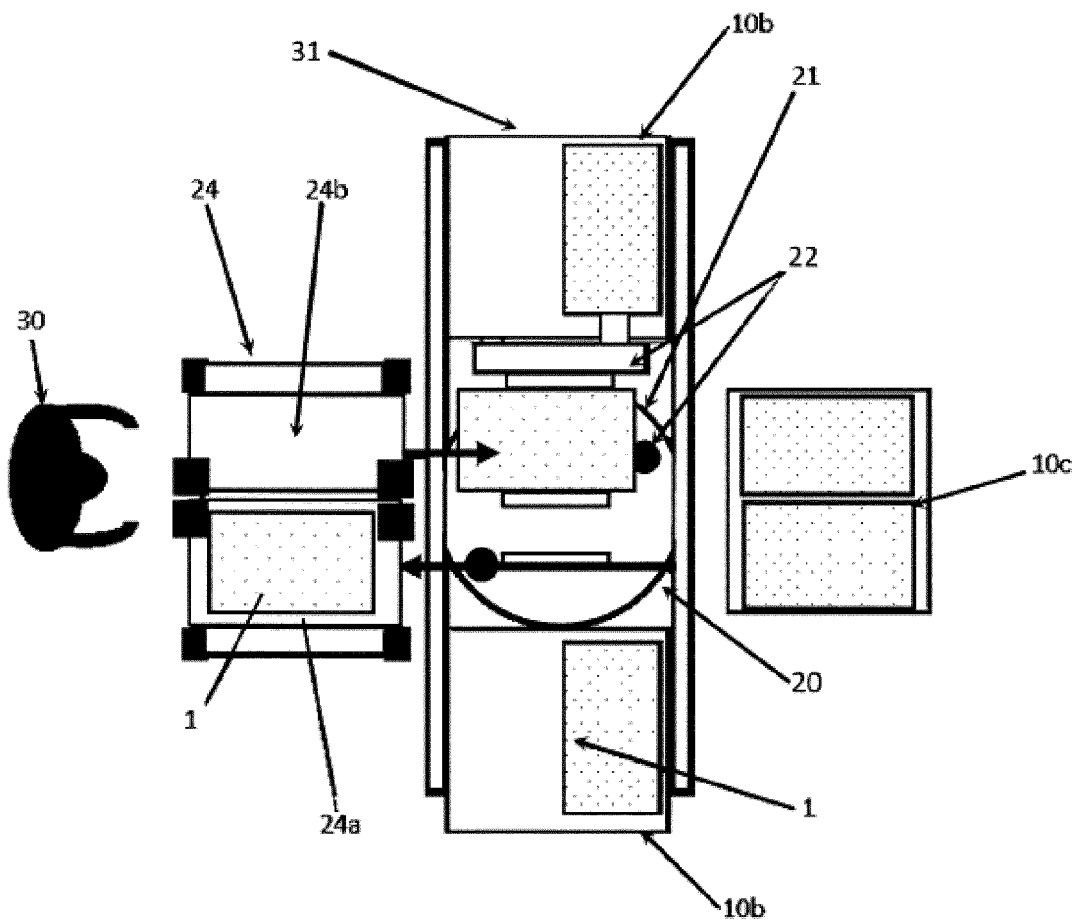
FIG. 8 shows a packing station.

FIG. 8 shows an autonomous or semi-autonomous packing system, comprising a packing surface 24 carried out as a packing table provided at, in particular next to and in operation reach of, a transfer station 31. The vehicle 15 comprising the transfer device 20, more generally the transfer station 1 comprising the transfer device 20 according to FIGS. 8 to 12, may constitute the transfer station 31, whereby the transfer station 31 may be mobile or fixedly mounted. The packing system may be employed at the origin of a delivery chain, such as in the warehouse of an online e-commerce or mail-order enterprise. The packing table 24 is divided into 2 parts, each part comprising a lift and a height measuring device. The first part 24a of the packing table 24 is configured to receive empty cargo receptacles 1 from the rotatable platform or turntable 21 of a transfer device 20 of the transfer station 31, which pulls the empty cargo receptacle 1 from a third cargo receptacle cart 10c containing different sizes of empty cargo receptacles. The turntable 21 may optionally be mounted on a lifting device and may therefore be lowered and raised. The picking robot 30 or service personnel packs the cargo for delivery into the cargo receptacle 1 provided by the third cargo receptacle cart 10c/by the turntable 21. The cargo to be packed can be arranged in boxes or shelves (not shown) within reach of the picking robot 30 or service personnel. In addition, a stock of differently sized cargo receptacles can be arranged next to the picking robot 30 or service personnel and placed on the packing table 24 for packing. Once an appropriately sized cargo receptacle 1 has been packed, the transfer station 31 retrieves the packed cargo receptacle and transfers it via the transfer device 20 comprising the rotating platform or turntable 21 to the onward cargo receptacle cart 10b. Alternatively, the transfer device 20 of the transfer station 31 may comprise at least one robotic arm for extracting empty cargo receptacles 1 contained in cargo receptacle cart and placing them onto the packing surface 24, in particular the first part 24a of the packing surface. After the cargo receptacle 1 has been packed with cargo, the robotic arm transfers it to an onward cargo receptacle cart 10b.

Allocation of a filled cargo receptacle 1 to the appropriate onward cargo receptacle cart 10b is preferably performed automatically by means of sensors 35 connected to an electronic circuit with a transfer management program, the sensors 35 being configured to read ID-tags provided on the cargo receptacles and, optionally, on the onward cargo receptacle cart 10b. The sensors 35 may be arranged at suitable positions on the transfer station 31. Optionally, as a transfer station 31, a vehicle 15 according to FIGS. 3 to 5 may be used.

Figure 9:
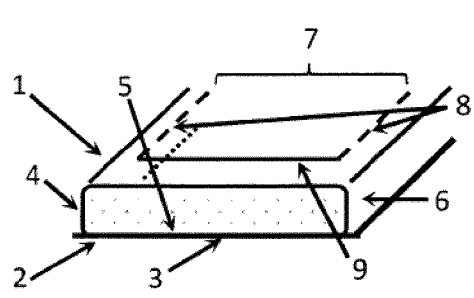
FIG. 9 shows a cargo receptacle.

FIG. 9 shows a re-usable cargo receptacle 1 comprising a self-supporting mount 2 for mounting on a system of laterally spaced apart tracks, the tracks being suitable for carrying the cargo receptacle between two transport positions. The mount 2 includes a ring-shaped frame 3 having a preferably rectangular outline. The mount 2 further includes a cargo support surface, in particular a base plate extending between the external limits of the frame 3. The frame 3 and, preferably, the cargo support surface are rigid and preferably consist of steel, aluminum, hard plastic or a combined material containing a hard plastic and high pressure cast aluminum. A flexible member 4 is fixed with its first end 5 to the mount 2, in particular to the frame 3, and bounds a storage volume for cargo. The flexible member 4 can be a vertically extendible bag fixed to the mount 2, in particular the frame 3. The flexible member 4 shown here is in its first expansion state in which the skirt 6 extends vertically away from the frame 3 by one level. In its ground state, however, the flexible member 4 may lie folded or collapsed across the mount 2. At its first end 5, the skirt 6 comprises fixing means such as a series of loops wrapped around the frame 3. The loops may be closed by buckles. The flexible member 4 preferably comprises a textile, in particular a textile resistant to wear and tear, such as canvas or a textile such as a ballistic nylon, in particular for high-value cargo. Instead of being carried out as a bag, the flexible member 4 may be realized as a flexible box.

Preferably, the cargo receptacle comprises an ID-tag, such as a QR code, a barcode, or an RFID tag. The ID-tag, such as an RFID-tag, is preferably arranged on the exterior of a side surface of the cargo receptacle, for example the exterior of a side surface of the flexible member or of the mount. Preferably, the ID-tag is encoded, in particular optically or electronically encoded with information relating to the size and/or content of the cargo receptacle, the fill status of the cargo receptacle as vacant, partially vacant or full, and/or relating to the delivery status of the cargo contained in the receptacle such as whether or not it is a return-delivery.

Figure 10:
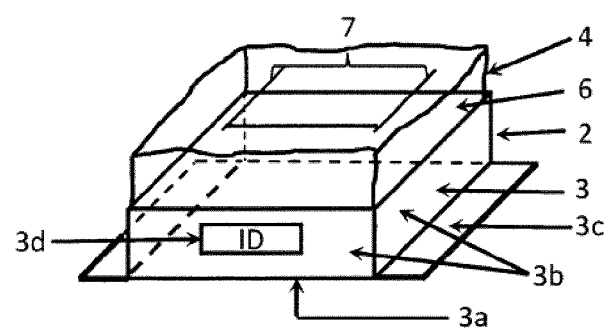
FIG. 10 shows a cargo receptacle in an extended state.

FIG. 10 shows a cargo receptacle 1 comprising a mount 2 which includes a tray 3 comprising a base plate 3a from which side walls 3b extend vertically and from which a rim, in particular flange or rim structure 3c extends laterally. The flange or rim structure 3c is suitable for mounting the cargo receptacle 1 on a system of spaced apart tracks. A flexible member 4 is fixed at its first end 5 to the mount 2, preferably along multiple points of the sidewalls 3b and/or of the base plate 3a. In its ground state, the flexible member 4 is collapsed into the interior of the tray. In the first state of expansion to a first level, the flexible member 4, extends vertically beyond the upper edge of the tray away from the flange or rim structure 3c. As previously presented, the flexible member 4 may include an external access 7 and spanning elements. In addition, as previously presented, an identification tag 3d may be fixed to the tray, in particular to the exterior of the sidewall or sidewalls 3b.

Figure 11:
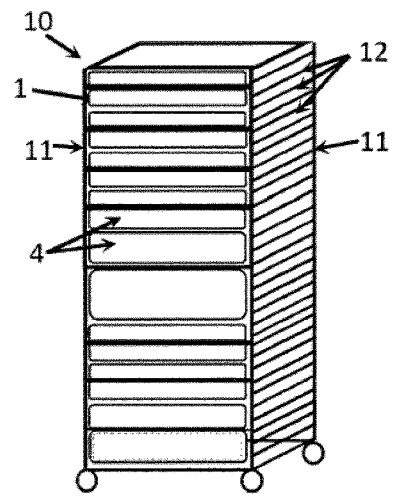
FIG. 11 shows a cargo receptacle cart.

FIG. 11 is a perspective view of a cargo receptacle cart 10 comprising a vertical array of laterally spaced apart pairs of tracks 12 on which a number of cargo receptacles 1 are mounted. The cargo receptacle cart 10 comprises a generally polyhedron-shaped frame, in particular as a prism with a square or rectangular cross-section. The tracks 12 extend laterally along two sides of the frame that are opposite each other and connect corresponding corner pillars 11 of the frame, the two opposite sides being separated from one another by at least one additional side of the frame, the at least one additional side being suitable for insertion and removal of a cargo receptacle 1 into and from the cargo receptacle cart 10. This side is considered an access face of the cargo receptacle cart 10. In the perspective along the longitudinal axis of the tracks 12, they may at least partially comprise an L-shaped cross section, the long leg of the "L" being the mounting surface on which the mount of a cargo receptacle 1 is mounted and the short leg of the "L" being the fixing surface for fixing the respective track to the frame, in particular to the pillars of the cart 10. Additional pillars may be arranged between the two corner pillars 11 for supporting the tracks 12 along their length (along a side of the cart 10). Instead of pillars 11, the cargo receptacle cart 10 may comprise solid external surfaces of sheets constituting the faces of a polyhedron, in particular metallic sheets, interconnected at vertices. Optional wheels are provided at the bottom of the cart 10 to facilitate displacement across the ground or surface. The cargo receptacle cart 10 may comprise a locking bar (not shown) or a locking door extending longitudinally along a side, in particular a supporting structure such as a corner pillar 11, said locking bar or locking door including pivot means such as a hinge interconnected to the corner pillar 11 of the cargo receptacle cart 1. Further the cargo receptacle cart 10 may comprise sensors 35 and measuring points to allow for automated storage of cargo receptacles 1. The holder component 22 of the transfer station, such as a pair of forks, is configured to extend underneath the mount 2, preferably on the inside of the tracks 12, to contact the underside of the mount and pull out the cargo receptacle 1. Generally, the cargo storage unit, in particular the cargo receptacle cart 10, may comprise an optical indicator (not shown) configured to indicate which cargo receptacle 1 carried by the cargo storage unit shall be removed from the cargo storage unit and which shall remain in the cargo storage unit. For example, the optical indicator may comprise a light strip arranged on the cargo storage unit next to its access face, for example along a pillar 11 or near the edge of a metallic sheet constituting a side of the cargo receptacle cart 10. The light strip may be configured to illuminate a light adjacent to a cargo receptacle 1, indicating, with a predefined color, such as green or red, whether or not the cargo receptacle 1 shall be moved by service personnel, vehicle and/or transfer station. The light strip may be arranged in a vertical orientation. The light of the light strip may comprise at least one LED. The light strip may be operated according to instructions from the tracking system 34.

Figure 12:
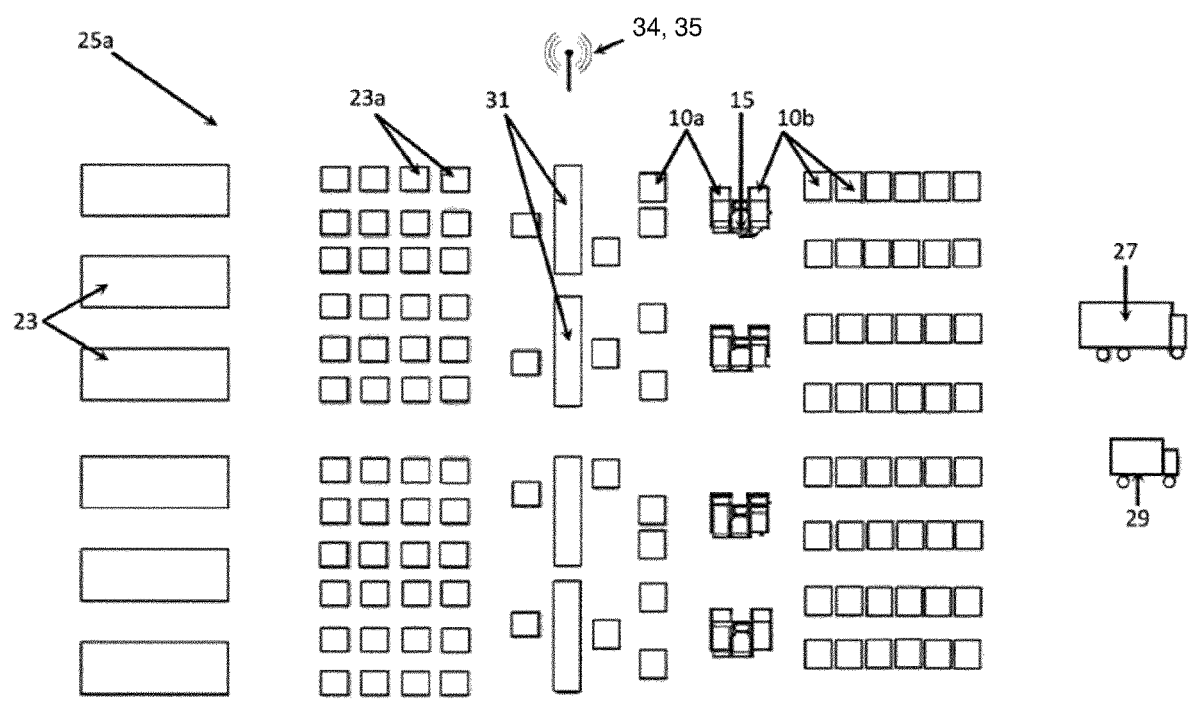
FIG. 12 shows a first cargo logistics system.

FIG. 12 shows a cargo logistics system 25a as set up at a cargo dispatch area, for example in the depot of a mail-order firm or in the fulfillment center of an e-commerce enterprise. Cargo, such as cargo pre-packaged by the manufacturer of a product such as a cellular phone, is stored at first cargo hold 23 which serves as bulk storage. The cargo is transferred, in particular sorted, by service personnel or by a vehicle 15 such as one described in this document to a second cargo hold 23a with smaller containers according to destination, size, urgency etc. From the second cargo hold 23a, cargo is transferred to a packing station such as one shown in FIG. 8, where it is transferred to a cargo receptacle cart 10a. The cargo receptacle cart 20a is brought either by service personnel or a vehicle 15 such as one described in this document to a second cargo receptacle cart 10b, to which the cargo is transferred in the manner described with reference to FIGS. 3 to 5. The travel of the vehicle may be directed by, for example, a tracking system 34 set up in the area. Alternatively, the vehicle 15 may move the second cargo receptacle cart 10b to the first cargo receptacle cart 10a as directed by the electronic cargo tracking system 34 set up in the area. Once the second cargo receptacle cart 10b is occupied, it is transferred by service personnel or by a vehicle 15 to a transport vehicle 27 or smaller transport vehicle 29 for its onward journey to a destination or intermediate destination, which may be a sorting center.

Figure 13:
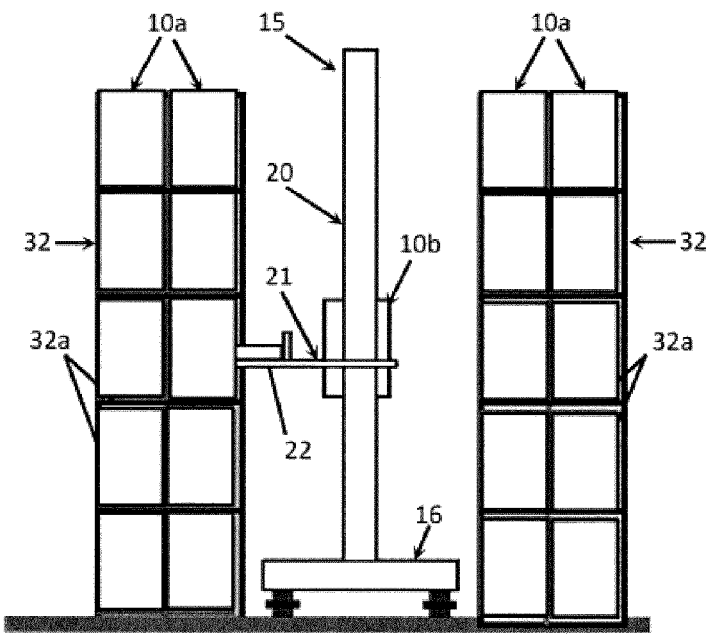
FIG. 13 shows a cargo logistics system including a high bay storage.

FIG. 13 shows a part of a cargo logistics system in a high bay mail dispatch or sorting area, typically at the depot of a mail order firm or larger sorting center. High bay racks 32 are provided with multiple shelves 32a. Cargo receptacle carts 10a may be arranged on the shelves and may be locked into position with wheel locks or parked into position-securing cargo receptacle bays. A vehicle 15 such as one described with reference to FIGS. 3 to 7, carrying a cargo receptacle cart 10a moves in the alley between the racks 32 and stops at a position where it picks up, by means of the transfer device 20 including such means as a rotatable platform 21, push-pull mechanism 22 or robotic arm, a cargo receptacle 1 from a high bay shelf 32a, in particular from a cargo receptacle cart 10a if one is parked on the shelf. The reverse is also possible where the vehicle 15, carrying a cargo receptacle cart 10b at least partially loaded with cargo receptacles 1, stops by high bay shelf 32a, in particular a cargo receptacle 10a on the shelf 32a and places the cargo receptacle 1 into a designated or free slot or track pair 12 of the cargo receptacle 10a on the shelf 32a.

Figure 14:
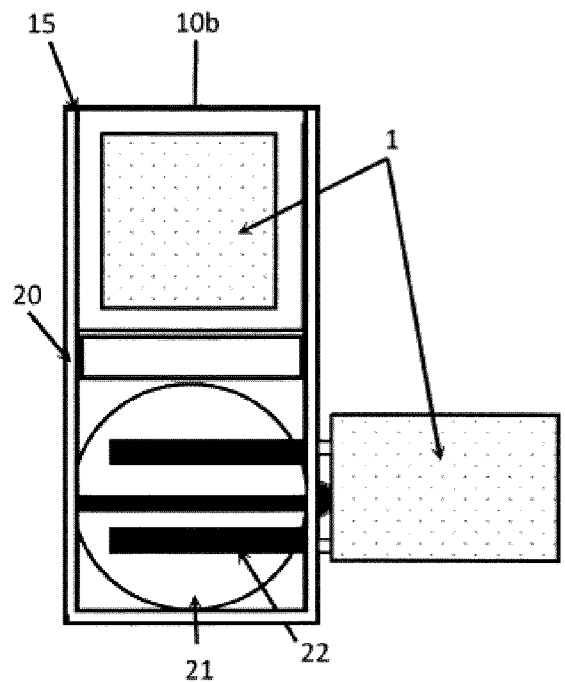
FIG. 14 shows a transfer station for use in a high bay storage.

FIG. 14 is a top view of the vehicle 15 shown in FIG. 13, in particular a cargo receptacle cart 10b carried by the vehicle 15 and a transfer device 20 including a rotatable and liftable platform 21 and a push-pull mechanism 22 for passing the cargo receptacle 1 in and out of the vehicle 15.

Figure 15:
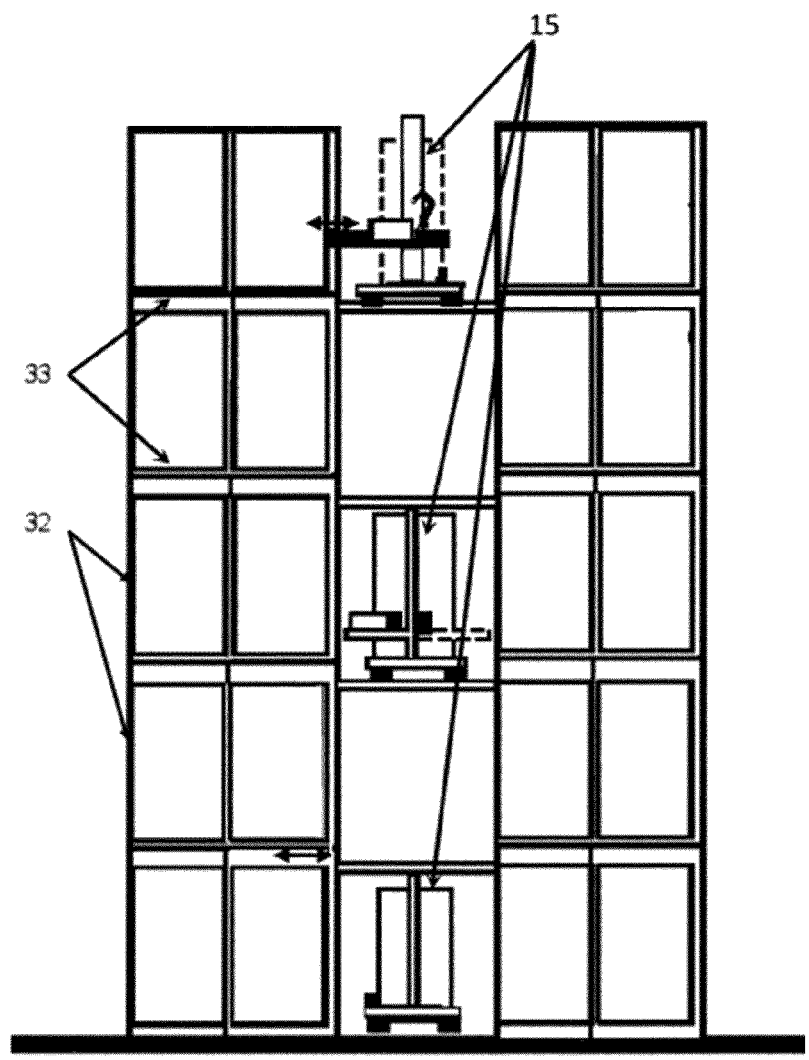
FIG. 15 shows a cargo logistics system including a multi-tiered high bay storage.

FIG. 15 shows a part of a cargo logistics system in another high bay mail dispatch or sorting area, typically at the depot of a mail order firm or larger sorting center. Cargo receptacle carts 10a are arranged on multiple floors 33 of a multi-floored depot. On each floor 33, a high bay rack 32 may be provided as shown in the previous examples are possible consisting of one or more shelves. Travelling on each level 33 is a vehicle performing operations as described in this document. On different floors, cargo receptacle carts 10a of particular content may be held. In particular, on the ground floor, the vehicle 15 delivers a cargo receptacle cart 10 filled with cargo receptacles 1 and places it on a shelf of a high bay rack 32. The vehicle 15 may also remove a cargo receptacle cart 10 from this floor 33. On the third (middle) floor 33, cargo receptacles 1 may be exchanged, via the transfer station or vehicle 15, between different cargo receptacle carts 10 which may include a cargo receptacle cart 10 carried by the vehicle and a cargo receptacle cart 10 or cargo storage unit parked on this floor. The cargo receptacles 1 may include empty cargo receptacles 1 for deposition or retrieval. On the uppermost level, a transfer station 31 or vehicle 15 is used that comprises a picking robot or picking device configured to place and remove cargo into/from a cargo receptacle cart 10 and/or a cargo receptacle 1, and place the cargo into an empty or partially filled cargo receptacle 1 carried by the vehicle 15 on the at least one platform 21 in the manner described with respect to FIG. 7. The picking robot or picking device may alternatively be provided separately from the vehicle 15 on the respective high bay level and is configured to place cargo onto a packing surface as shown with respect to FIG. 8, instead of or together with, service personnel. The cargo receptacle 1 to be filled with cargo may be provided in a cargo receptacle cart 10 carried by the vehicle 15 or it may be stored on the respective high bay level.

The cargo logistics systems according to FIGS. 13 and 15 advantageously enable a very high rate of cargo transfer and sorting in a limited space. In some variations, the high bay racks 32 or storage racks in general of the cargo logistics system are equipped with tracks suitable to carry cargo receptacles 1 without a cargo receptacle cart 10. The cargo logistics system including the high bay and/or storage floor system advantageously permits picking operations in the storage aisles.

Figure 16:
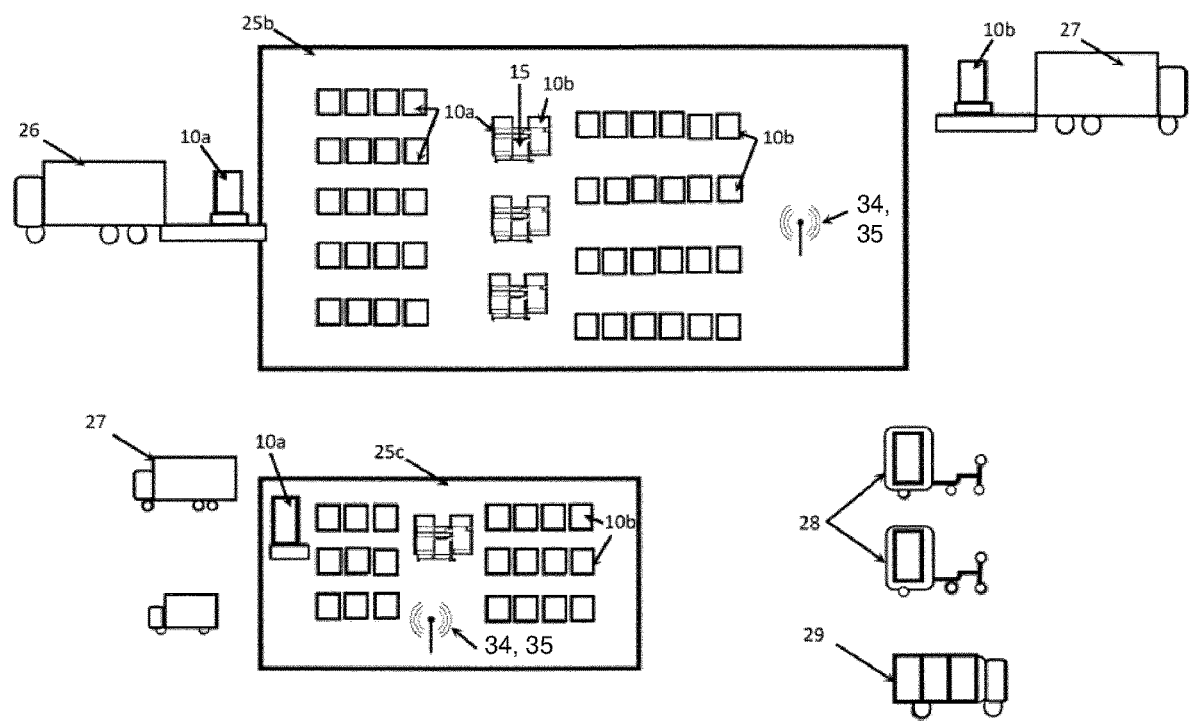
FIG. 16 shows a second cargo logistics system.

FIG. 16 shows a cargo logistics system including the devices and components described in this document. At a first sorting center 25b, a delivery vehicle 26 such as a truck arrives loaded with at least partially occupied cargo receptacle carts 10a, such as those that have been filled with cargo receptacles 1 at an origin, for example at a packing station of a mail-order enterprise according to FIG. 12. The cargo receptacle carts 10a are unloaded and moved to a holding area. This holding area may be one as described with reference to FIGS. 13 and 15 and cargo receptacles 10a may be placed into and removed from the holding area. This operation may be performed by a vehicle 15 and a tracking system 34 as described in this document. Alternatively, the vehicle 15 moves directly to an onward cargo receptacle cart 10b holding area and transfers the cargo receptacle 1 from the incoming cargo receptacle carts 10a to the appropriate onward cargo receptacle carts 10b according to their assigned destinations in the manner described with reference to FIGS. 3 to 7. The now at least partially filled onward cargo receptacle carts 10b are moved to an onward delivery vehicle 27 such as a truck. This truck arrives at a second sorting center 25c. The second sorting center may be assigned a smaller delivery area or domain than the first sorting center 25b. The cargo receptacles 1 are transferred to onward cargo receptacle carts 10b in the manner previously described. The latter are then transferred to smaller delivery vehicles, such as delivery bikes 28 or mid-to-small size delivery trucks or vans 29, which may deliver to the final destination such as a private or business residence.

The invention claimed is:

1. A system comprising a transfer station configured to handle cargo receptacles and an electronic cargo tracking system, wherein the transfer station comprises:
  i. a transfer device comprising
    a. at least one holder component configured to hold and release the cargo receptacles,
    b. at least one platform configured to support the cargo receptacles,
    c. at least one transfer device frame extending in a vertical direction, in which the at least one platform is mounted in a vertically displaceable manner, the transfer device frame comprising at least one lifting drive component configured to vertically displace the at least one platform,
  ii. a base member on which the transfer device frame is mounted, and
  iii. an electronic circuit configured to control an operation of at least one component of the transfer station, wherein the electronic circuit comprises an electronic communications interface configured to send and receive transfer station operation information to and from the electronic cargo tracking system, wherein an electronic circuit of the electronic cargo tracking system comprises at least one sensor or detector configured to detect position, size, and status information of the cargo receptacle and to detect identification number logic that includes information on the cargo item, cargo size, and capacity of the cargo receptacle cart.

2. The system according to claim 1, wherein the transfer device frame is rotatably mounted on the base member.

3. The system according to claim 2, wherein the base member comprises at least one turning drive component configured to rotate the transfer device about a vertical axis.

4. The system according to claim 1, comprising a travel drive component configured to move the transfer station between positions of travel.

5. The system according to claim 1, comprising at least one second holder component configured to hold and release cargo storage units comprising cargo receptacle carts.

6. The system according to claim 5, wherein the at least one second holder component configured to hold and release the cargo storage units comprises a platform configured to support an underside of at least one of the cargo storage units.

7. The system according to claim 1, wherein the at least one lifting drive component comprises one of a screw-and-nut lift or a linear actuator mounted on a track.

8. The system according to claim 1, wherein the transfer device comprises at least one turning drive component configured to rotate the at least one platform separately from the transfer device frame.

9. The system according to claim 8, wherein the at least one turning drive component configured to rotate the at least one platform separately from the transfer device frame is mounted on the transfer device frame.

10. The system according to claim 1, wherein the travel drive component is configured to rotate the transfer station.

11. The system according to claim 1, wherein the at least one holder component comprises at least one push-pull mechanism configured to remove at least one of the cargo receptacles from a first cargo storage unit and to insert the at least one cargo receptacle into a second cargo storage unit.

12. The system according to claim 1, wherein the at least one holder component comprises a picking device configured to pick cargo items to be placed into or removed from the cargo receptacles.

13. The system according to claim 1, wherein the transfer device comprises a plurality of platforms configured to support the cargo receptacles, wherein the plurality of platforms are mounted in the at least one transfer device frame in a vertically displaceable manner, wherein the plurality of platforms are spaced apart from each other in the vertical direction.

14. The system according to claim 1, wherein a respective sensor or detector is arranged on at least one of the transfer station and a cargo storage unit, or at certain fixed positions in a warehouse.

15. The system according to claim 1, wherein the transfer station is provided in a packing station, wherein the packing station comprises a second electronic circuit that includes sensors or detectors for detecting at least one of position, size, and fill-status of cargo receptacles.

16. The system according to claim 15, wherein the packing station is configured to determine in which storage position or on which level of a cargo storage unit a new cargo receptacle can be placed, wherein the packing station comprises a measuring device, wherein the measuring device is an optical and/or laser measuring device.

17. The system according to claim 1, wherein the electronic cargo tracking system includes a second electronic circuit, wherein the electronic cargo tracking system includes at least one optical indicator or electronic tag provided on a cargo receptacle, cargo storage unit and/or a transfer station, the at least one optical indicator or electronic tag configured to communicate with the electronic circuit of the electronic cargo tracking system, and wherein the electronic cargo tracking system comprises at least one handheld device configured to read the at least one optical indicator or electronic tag.

18. A cargo receptacle sorting method in which the transfer station of the system according to claim 1 is operated, the method comprising:
  transferring, via the at least one holder component, at least one of the cargo receptacles from at least one cargo storage unit onto the at least one platform; and
  transferring, via the at least one holder component, the at least one of the cargo receptacles from the at least one platform to a second cargo storage unit.

19. The cargo receptacle sorting method according to claim 18, further comprising:
  moving, via the transfer station, the at least one cargo storage unit to a position where the at least one holder component is in handling reach of the second cargo storage unit.

20. The cargo receptacle sorting method according to claim 18, wherein the transfer station comprises a picking device, the method further comprising:
  picking, via the picking device, cargo from a cargo hold or from the at least one cargo storage unit; and
  placing, via the picking device, the cargo into the at least one of the cargo receptacles on the at least one platform.

21. The cargo receptacle sorting method according to claim 18, the method further comprising:
  placing the cargo receptacles next to each other on the at least one platform.

22. A cargo logistics system comprising:
  a. at least one transfer station configured to handle cargo receptacles and an electronic cargo tracking system, wherein the transfer station comprises:
    i. a transfer device comprising
      a. at least one holder component configured to hold and release the cargo receptacles,
      b. at least one platform configured to support the cargo receptacles,
      c. at least one transfer device frame extending in a vertical direction, in which the at least one platform is mounted in a vertically displaceable manner, the transfer device frame comprising at least one lifting drive component configured to vertically displace the at least one platform,
    ii. a base member on which the transfer device frame is mounted, and iii. an electronic circuit configured to control an operation of at least one component of the transfer station, wherein the electronic circuit comprises an electronic communications interface configured to send and receive transfer station operation information to and from the electronic cargo tracking system, wherein an electronic circuit of the electronic cargo tracking system comprises at least one sensor or detector configured to detect position, size, and status information of the cargo receptacle and to detect identification number logic that includes information on the cargo item, cargo size, and capacity of the cargo receptacle cart, b. at least one cargo receptacle comprising a mount, wherein the at least one holder component of the transfer station is configured to hold and release the cargo receptacles by their respective mount, c. at least one cargo receptacle cart comprising a polyhedron frame comprising at least one access face for insertion and removal of the at least one cargo receptacle, the cargo receptacle cart further comprising a system of tracks spaced apart laterally for carrying the at least one cargo receptacle by its mount, in particular its rim, each track comprising a mounting surface or seat extending laterally between the access face and an opposite face of the frame, and each of the at least one cargo receptacle, the at least one cargo receptacle cart, and the at least one transfer station being coordinated with respect to the other for carrying out a cargo receptacle sorting method, in which the transfer station is operated, whereby the at least one holder component transfers the cargo receptacles from the at least one cargo receptacle cart onto the at least one platform and the at least one holder component transfers the cargo receptacles from the at least one platform to at least one cargo receptacle cart, wherein the cargo receptacle cart comprises an array of track pairs arranged on different height levels of the cargo receptacle cart such that the array of track pairs are arranged equidistant from one another in height direction; and wherein the cargo logistics system is configured to determine in which storage position or on which level of the cargo storage unit the new cargo receptacle can be placed to optimize use of space in the cargo storage unit, wherein this determination is done by the cargo logistics system based on measures of a size of the cargo receptacle.

23. The cargo logistics system according to claim 22, the electronic cargo tracking system being configured to track the cargo receptacle, the cargo receptacle cart, and/or the transfer station based on detecting identification tags and/or optical indicators.

24. The cargo logistics system according to claim 22, further comprising a measuring device, wherein the measuring device is an optical and/or a laser measuring device.

25. The cargo logistics system according to claim 22, wherein the cargo receptacle comprises an ID-tag encoded with information relating to the size of the cargo receptacle and a fill status of the cargo receptacle as vacant, partially vacant, or full.

26. The cargo logistics system according to claim 22, wherein the cargo receptacle comprises an ID-tag encoded with information relating to a content of the cargo receptacle and/or relating to a delivery status of the cargo contained in the cargo receptacle.

27. The cargo logistics system according to claim 22, wherein the cargo receptacle comprises a mount and a cargo volume adjustment mechanism configured to increase and decrease the interior volume of the cargo receptacle.

\* \* \* \* \*